(12) United States Patent
Westberg et al.

(10) Patent No.: US 10,737,630 B2
(45) Date of Patent: Aug. 11, 2020

(54) SUPPORT FOOT FOR LUGGAGE CARRIER

(71) Applicant: MONT BLANC INDUSTRI AB, Dalsjöfors (SE)

(72) Inventors: Petrus Westberg, Borås (SE); Fredrik Kristoffersson, Fristad (SE); Jonas Holmkvist, Hökerum (SE)

(73) Assignee: MONT BLANC INDUSTRI AB, Dalsjöfors (SE)

( * ) Notice: Subject to any disclaimer, the term of this patent is extended or adjusted under 35 U.S.C. 154(b) by 507 days.

(21) Appl. No.: 14/900,932

(22) PCT Filed: Jun. 18, 2014

(86) PCT No.: PCT/SE2014/050748
§ 371 (c)(1),
(2) Date: Dec. 22, 2015

(87) PCT Pub. No.: WO2014/209202
PCT Pub. Date: Dec. 31, 2014

(65) Prior Publication Data
US 2016/0144795 A1 May 26, 2016

(30) Foreign Application Priority Data
Jun. 24, 2013 (SE) ...................................... 1350761

(51) Int. Cl.
*B60R 9/058* (2006.01)
*B60R 9/045* (2006.01)

(52) U.S. Cl.
CPC .............. *B60R 9/058* (2013.01); *B60R 9/045* (2013.01)

(58) Field of Classification Search
CPC .......... B60R 9/058; B60R 9/045; B60R 9/048
USPC ....... 224/322, 323, 321, 309, 315, 329, 331, 224/326, 319, 324, 558, 330
See application file for complete search history.

(56) References Cited

U.S. PATENT DOCUMENTS

| 3,554,416 A | 1/1971 | Bott |
| 4,448,337 A | 5/1984 | Cronce |
| 4,911,348 A | 3/1990 | Rasor et al. |
| 5,082,158 A * | 1/1992 | Bott ........................ B60R 9/045 224/321 |

(Continued)

FOREIGN PATENT DOCUMENTS

| SE | 514079 C2 | 12/2000 |
| WO | WO 2004/024506 A1 | 3/2004 |
| WO | WO 2005/035315 A1 | 4/2005 |

OTHER PUBLICATIONS

International Search Report (PCT/ISA/210) dated Oct. 23, 2014, by the Japanese Patent Office as the International Searching Authority for International Application No. PCT/SE2014/050748.

*Primary Examiner* — Nathan J Newhouse
*Assistant Examiner* — Matthew T Theis
(74) *Attorney, Agent, or Firm* — Buchanan Ingersoll & Rooney P.C.

(57) ABSTRACT

A support foot for a luggage carrier, for a vehicle, said support foot including a main part, a first clamping part, a second clamping part wherein at least one of said clamping parts are movable and a clamping mechanism, said clamping mechanism including an attachment lever, arranged to secure a load bar to a mounting rail or similar device, wherein said attachment lever is arranged at one side of said main part and is arranged to operate in a horizontal plane between a closed and an open position.

14 Claims, 4 Drawing Sheets

(56) References Cited

U.S. PATENT DOCUMENTS

| | | | |
|---|---|---|---|
| 7,721,925 B1* | 5/2010 | Graffy | B60R 9/058 |
| | | | 224/322 |
| 8,302,828 B2 | 11/2012 | Kim et al. | |
| 2002/0079341 A1 | 6/2002 | Karlsson | |
| 2003/0160077 A1* | 8/2003 | Aftanas | B60R 9/045 |
| | | | 224/321 |
| 2006/0208022 A1 | 9/2006 | Karlsson | |
| 2010/0147914 A1* | 6/2010 | Sautter | B60R 9/045 |
| | | | 224/325 |

* cited by examiner

SUPPORT FOOT FOR LUGGAGE CARRIER

FIELD OF THE INVENTION

This invention relates to a support foot for a luggage carrier, for a vehicle, said support foot comprising a main part, a first clamping part, a second clamping part wherein at least one of the clamping parts is movable and a clamping mechanism, said clamping mechanism comprising an attachment lever, arranged to secure a load bar to a mounting rail or similar device.

BACKGROUND INFORMATION

Because of limited internal space in vehicles, a variety of cargo or leisure equipment is loaded on the roof thereof. To this end, a luggage carrier is mounted on the roof of a vehicle.

The luggage carrier for many vehicles of today includes mounting rails which are provided on both sides of the roof in the longitudinal direction of a vehicle, and load bars which are transversely mounted between the mounting rails. The load bars are secured to the mounting rails so as to hold cargo at a predetermined position. When it is required to remove or to change the position of the load bars, it is necessary to release the load bar from the mounting rails. Thus, the luggage carrier is constructed so that a passenger adjusts the position of the load bar to be appropriate to the size or length of the cargo, and secures the load bar at the adjusted position between the mounting rails.

Conventional load bars of a luggage carrier for vehicles is often problematic in that it includes a support foot having fastening devices with mechanisms including levers in combination with wires and/or springs making the construction complicated, and the manufacturing cost may be high. Further, after the wires and/or springs have been used for a period of time, the durability of a product is reduced due to the deterioration of the wires and/or springs. Further, it has been found that operating the lever may be difficult.

Other, past known locking assemblies have been developed including a manually rotatable knob which can draw a cam member against the rail or tool which locks/releases the support foot and load bar. These past known mechanisms have been found unsatisfactory because they are inconvenient to the user. Vehicle owners tend to misplace tools used to release support foots while knob-operated mechanisms may be difficult to rotate with sufficient force.

The document U.S. Pat. No. 4,911,348 shows adjustable cross rails with support stanchions which includes a release mechanism which conforms to the configuration of the stanchion and the cross rails are capable of being brought into contiguous engagement to form an aerodynamic wing.

The document U.S. Pat. No. 8,302,828 shows a cross bar of a roof carrier for vehicles, which uses one wire and has a lever on only one side and which uses a two-stage locking method.

From U.S. Pat. No. 4,448,337 there is known a carrier system with fixed slat assemblies (a kind of rail mechanism) having slots for fixation of brackets, which presents disadvantages from several view points.

SUMMARY OF THE INVENTION

It is an object of the present invention to overcome or at least minimize at least one of the drawbacks and disadvantages of the above described problems.

Thanks to the invention there is provided a load bar with an attachment lever which operates in a horizontal plane giving the advantages, compared to generally used prior art mechanism, that the lever may be easier to manoeuvre, e.g. be longer with better ratio thanks to more available space and better ergonomics which may imply higher clamping force and lower mounting force, presenting the advantage that it may be used on both open and closed mounting rails as well as for rails with provisions.

According to another aspect of the invention the attachment lever is integrated with the support foot in a closed position which gives the advantages that the support foot does not have any protruding parts.

According to still another aspect of the invention the clamping mechanism comprises a pull rod which is pivotably connected to said attachment lever and a movable clamp, making no loose parts needed in the locking and unlocking operation.

According to yet another aspect of the invention the attachment lever have a fixed pivot point within the support foot about which the attachment lever is rotatable and the attachment lever also comprises a coupling part having a rotating shaft and the pull rod is rotatably fixed to the lever at said coupling part, off centered to the fixed pivot point, allowing the coupling part to move around the fixed pivot point when moving the attachment lever.

According to another aspect of the invention the pull rod in one end is rotatably fixed to the attachment lever at said coupling part and at the other end the pull rod is rotatably fixed at a second pivot point within said clamp which makes it easy to assemble the load bar by the movement of the attachment lever from the open to the closed position then the attachment lever in its movement drags the pull rod and thereby also the clamp against the rail to exert a clamping force on the rail and locks the support foot and thereby also the load bar to the rail. To disassemble the load bar from the rail the attachment lever is moved from the closed to the open position and thereby, through the pull rod, release the clamping force.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

The following detailed description, and the examples contained therein, are provided for the purpose of describing and illustrating certain embodiments of the invention only and are not intended to limit the scope of the invention in any way. It shall be understood that terms like inner refers to the side directed towards the vehicle roof and terms like outer refers to the side directed away from the vehicle, in a horizontal plane. The terms have been chosen merely to facilitate the understanding of the description. The skilled person also understands that when referring to a horizontal plane, that this should be construed in a wide manner, e.g. even including a lever operating in a plane that may be inclined up to ±45° in relation to the actual horizontal plane and still achieve basically the same functionality, furthermore it is evident that this definition assumes that the vehicle is on a horizontal plane. As is evident, the same principles apply for construing vertical.

Figure 1:
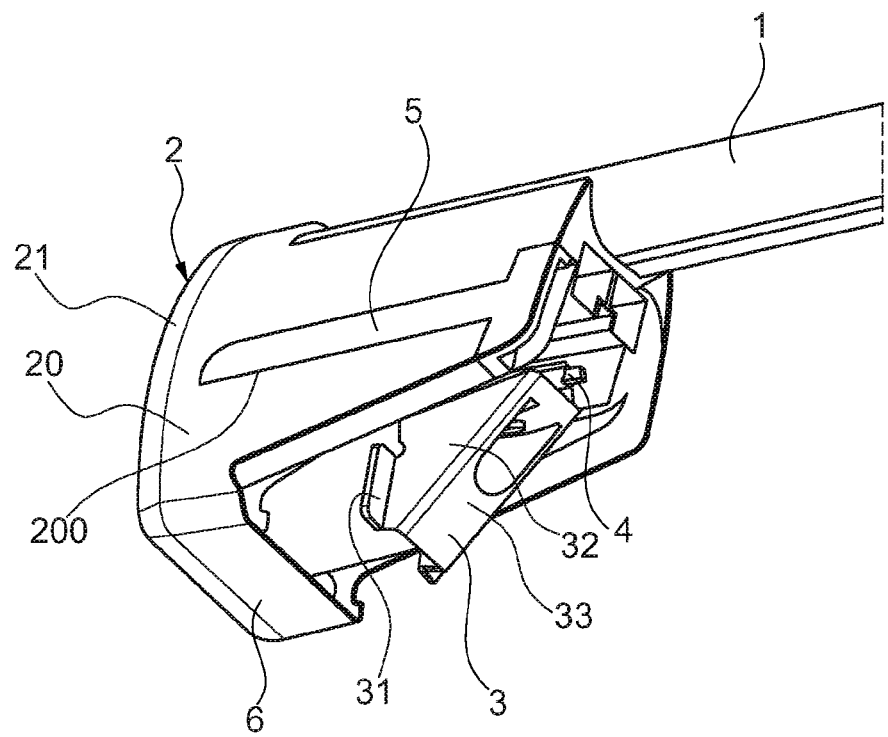
FIG. 1 is a perspective view of a support foot according to the invention.

Referring to FIG. 1, there is shown a perspective view of part of a load bar 1 and a support foot 2 in a preferred embodiment according to the invention. The load bar 1 is intended to be substantially horizontally adjustably mounted to mounting rails 7 that are fixedly secured on both longitudinal sides of a vehicle roof. The load bar 1 is attached to a support foot 2 on both distal ends thereof and are adjustably mounted to the rails 7 and said load bar 1 extending between the support foots 2 supported in spacial relation above the vehicle roof.

The support foot 2 comprises an outer cover 21, a main part 20, an inner movable clamp 3, a fixed outer clamping part 6 (that preferably is an integrated part of said main part 20) and a clamping mechanism disposed within said support foot 2. Said clamping mechanism comprising an attachment lever 5 arranged to secure a load bar 1 to a mounting rail 7. The main part 20 comprises a cutout 200 along one side which preferably has the same shape as the attachment lever 5 such that when the attachment lever 5 is in a closed position the attachment lever 5 and the main part 20 forms a smooth and even outer as is seen in FIG. 1.

Figure 2:
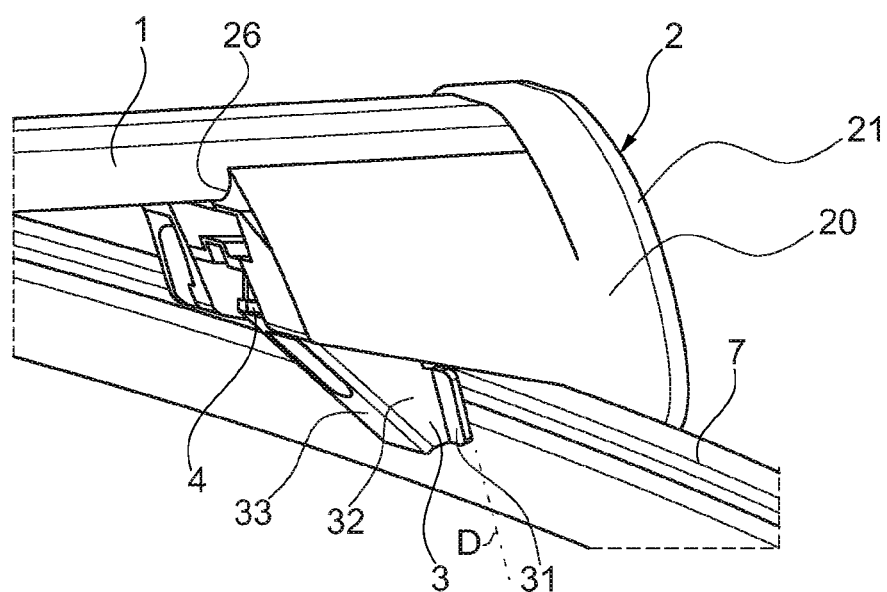
FIG. 2 is a perspective view of a support foot according to the invention when mounted on a rail.
Figure 7:
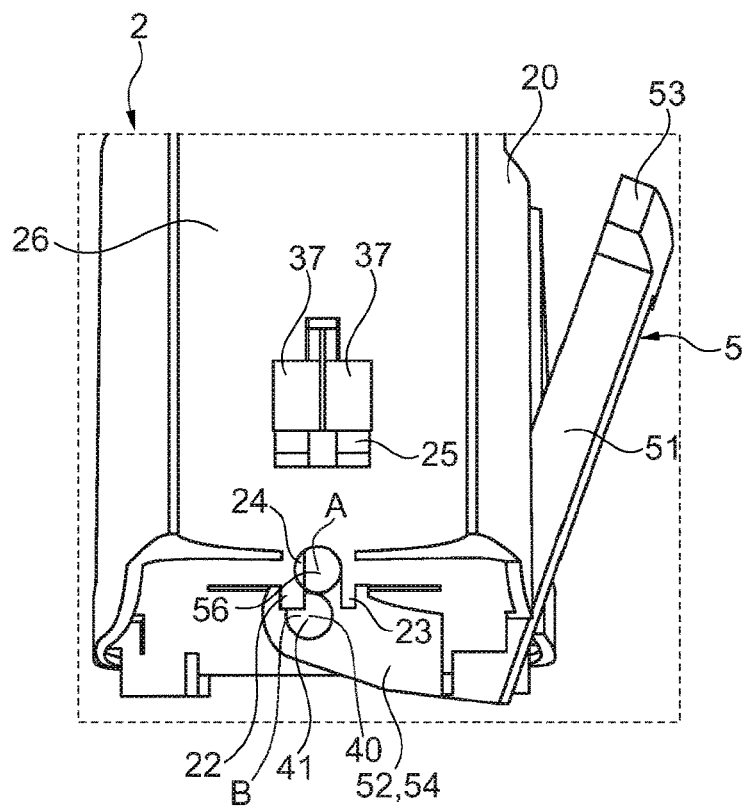
FIG. 7 is a view seen from above of parts of the support foot and the lever in an assembling position according to the invention.
Figure 8:
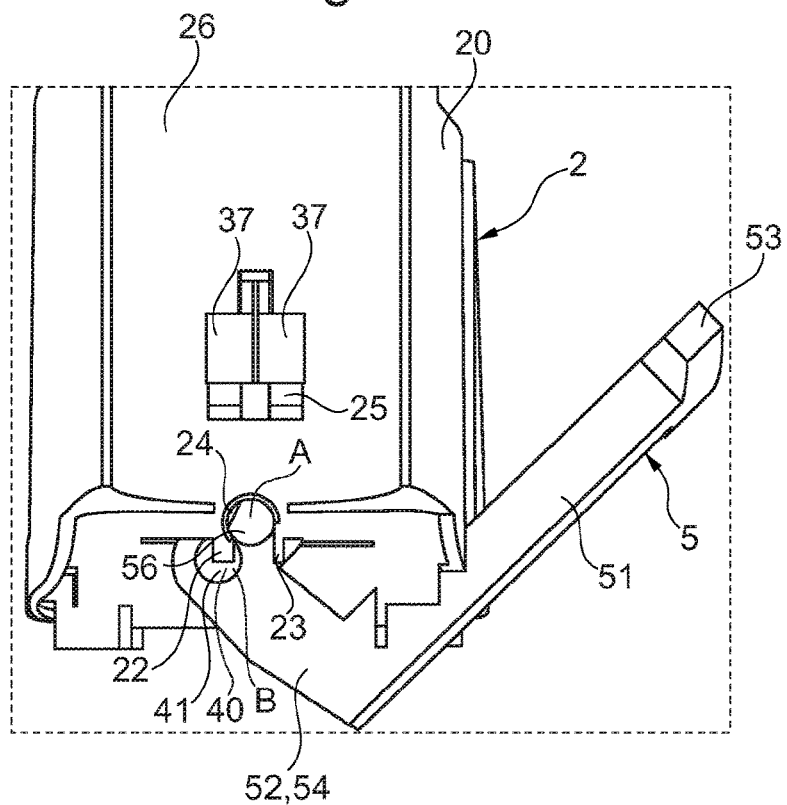
FIG. 8 is a view seen from above of parts of the support foot and the lever according to the invention.

FIG. 2 is a perspective view of a support foot 2 according to the invention when the load bar 1 is mounted on a rail 7. The load bar 1 is arranged in a groove 26 on an upper side of the support foot 2, the groove 26 is better seen in FIGS. 7 and 8. At mounting of the load bar 1 on the rails 7, the clamp 3 is arranged on an inner side of the rail 7 and the outer clamping part 6 of the support foot 2 is arranged on opposite side, the outer side of the rail 7. A locking operation is performed by means of the attachment lever 5 to firmly pin the clamp 3 and the outer clamping part 6 on each side of the mounting rail 7 to lockingly secure the support foot 2 and the load bar 1 to said mounting rail 7. When the support foot 2 is mounted on the rail 7 there is preferably still enough load on the clamp 3 to keep the lever 5 in position.

Figure 3:
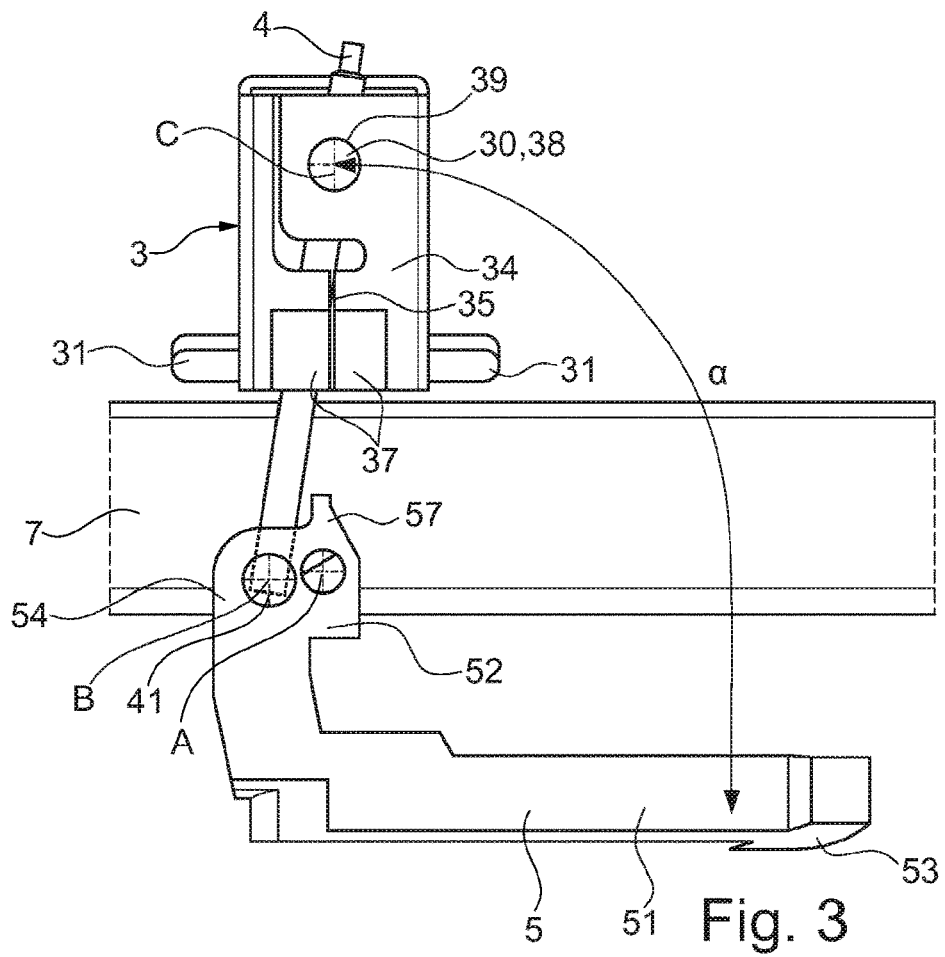
FIG. 3 is a view seen from above with the clamp and the lever in an open position according to the invention.

In FIG. 3-6 the support foot 2 is shown stripped from the main part 20 to more in detail show the interior. The attachment lever 5 and the inner clamp 3 preferably interacts with the clamping mechanism disposed within said support foot 2. In FIG. 3 is seen in a view from above how the clamp 3, the attachment lever 5 and the clamping mechanism are connected to each other. In FIG. 3 the attachment lever 5 is in an open position and the lever 5 extends adjacent the outer side of the rail 7 in the same direction as the rail 7. The attachment lever 5 has, in this view seen from above, the form of a J and preferably forms one integrated part comprising an outer grip portion 53, a middle handle portion 51, a bend 52 and a pivot portion 40, 50, 54, 55. The pivot portion comprises one upper 54 and one lower 55 half arranged with a space in between. The pivot portion has a fixed pivot point A comprising a protruding stub shaft 56 on each side arranged adjacent the lower inner end of the J. By means of the stub shafts 56 the attachment lever 5 is assembled with the support foot 2. The stub shaft 56 has the form of a cylinder, truncated in a vertical plane. Whereby when assembling the attachment lever 5 in production the lever 5 is rotated a certain assembling angle (approximately 20°) relative a closed position of the lever 5 and the straight cut on the stub shaft 56 allows the lever 5 to slide between two parallel substantial vertical walls 22, 23 into a circular groove 24 in the foot 2, the groove 24 extending in the vertical direction surrounding the stub shaft 56, see FIG. 7. When the attachment lever 5 is released more than the assembling angle the geometry prevents the lever 5 to slide out of the support foot 2 see FIG. 8. The attachment lever 5 is rotatable about the fixed pivot point A in the horizontal plane. Thanks to the positioning of the lever 5 and that the lever 5 is rotatable in the horizontal plane there is sufficient space to use an attachment lever 5 that is relatively long to provide improved leverage. The pivot portion also comprises one (e.g. in the horizontal plane) projecting locking member 57 (preferably an integrated projection) intended to interact with a lock (not shown) preferably arranged in the outer cover 21. The lock prevents opening of the attachment lever 5 when locked in a closed position by rotating the locking device (not shown) to move into contact with the locking member 57, thereby preventing pivoting of the lever 5. The locking member 57 may also be used to define a maximum opening angle, by positioning a stop member (not shown) in a preferred angular position, e.g. about 90°-110°.

The attachment lever 5 also comprises a coupling part 40 in the form of a circular hole arranged within the pivot portion. The coupling part 40 is intended to retain a rotating first shaft 41 (best seen in FIGS. 5 and 6) extending in a vertical direction between the upper 54 and lower 55 halves of the pivot portion. The lower half 55 is preferably designed with a non through passing hole, to prevent the shaft 41 to fall through when assembled. The upper half 54 preferably has a through hole as an upper fixation for the first shaft 41 (a semi-circular recess may be sufficient). A pull rod 4 is rotatably fixed to the lever 5 at said coupling part 40 at a second pivot point B off centred to the fixed pivot point A. The pull rod 4 may be in the form of a longish screw having a head at one end, which end preferably is attached to the coupling part 40 by means of a through hole in said first shaft 41. It should be understood that the pull rod 4 may be attached at said first shaft 41 in various ways, for example by welding or gluing. The pull rod 4 extends substantially horizontally from the coupling part 40 over the rail 7 and at its opposite end to the coupling part 40 said pull rod 4 is pivotably fixed at a third pivot point C within the movably clamp 3.

The clamp 3 is preferably a hollow part that has been manufactured by bending. The clamp 3 comprises two lower outwardly from the clamp 3 directed flanges 31 that extends in an inclined plane D (see FIG. 2) with respect to a vertical plane. When the load bar 1 is mounted to the rails 7 the flanges 31 abut the inner side of the rail 7, that may also be inclined in parallel with the flanges 31, or merely present a protruding edge. The flanges 31 deflects at substantially 90 degrees and forms two triangular portions side 32 of the clamp 3. The two side portions 32 are joined by a sloping back 33. The two side portions 32 are folded at their upper edges, substantially about 90 degrees, toward each other, to form an upper plane 34 with a small gap 35 in between, in a horizontal plane. At one end of said upper plane 34 (that is closest to the rail 7), from both sides of said gap 35, two substantially vertical walls 36 extend. At their upper edges said walls 36 deflect about 90 degrees and form a T-shaped gripping portion 37, wherein the top of T is in horizontal plane. The T 37, 36 extends through a through hole 25 (see FIGS. 7 and 8) in the main part 20 of the foot 2 so that the gripping portion 37 is in the groove 26, on the upper side of the main part 20. The gripping portion 37 may act as a slide on feature when the load bar 1 is assembled to the support foot 2 in the groove 26. The gripping portion 37 also serves to lock the load bar 1 against the support foot 2 when the lever 5 is moved to the closed position, since then the inclined flanges 31 are pressed inwards and slide downwardly against the rail 7 (along plane D) and thereby pressing the clamp 3 downwards. The gripping portion 37 clamp the load bar 1 against the support foot 2. It is also possible to lock the load bar 1 by the gripping portion 37 even if there is not an inclined plane D, since there is normally arranged a play between the pull rod 4 and the second shaft 38, resulting in a pivoting movement of the movable clamp 3, about the flanges 31, that will press the gripping portion 37 downwards to secure the load bar 1, between the main part 20 and the gripping portion 37. The pull rod 4 is pivotably fixed at said third pivot point C within the clamp 3. The third pivot point C comprises a rotatable second shaft 38 extending in a vertical direction between the sloping back 33 and a hole 39 in the upper plane 34. The hole 39 is positioned in the middle of the upper plane 34 by having a second part of the gap 35 positioned off centred. The pull rod 4 is pivotably fixed at said third pivot point C, e.g. by means of a threaded hole in the second shaft 38, or a bult attached adjacent the end when using a clean through hole in the shaft 38.

Figure 4:
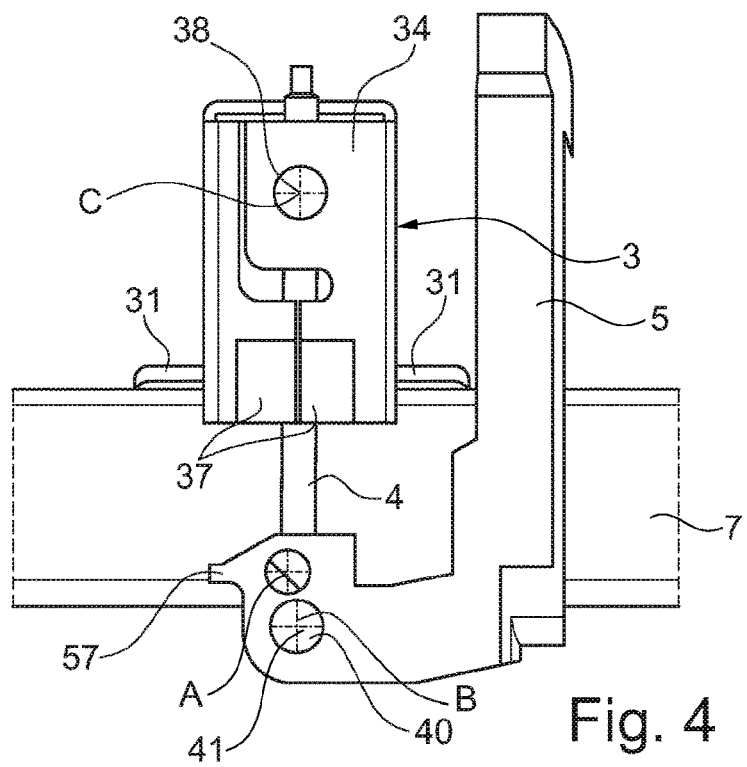
FIG. 4 is a view seen from above with the clamp and the lever in a closed position according to the invention.

In FIG. 4 is seen in a view from above how the attachment lever 5 is in a closed position and the support foot 2 is tightened around the rail 7 by the flanges 31 abutting vertical surfaces from the inner side of the rail 7 and the outer fixed clamping part 6 of the support foot 2 abutting opposing vertical surfaces from the outer side of the rail 7 (see FIG. 2). In the closed position the handle 51 of said attachment lever 5 extends perpendicular to the extension of the rail 7 and above the rail 7.

Figure 5:
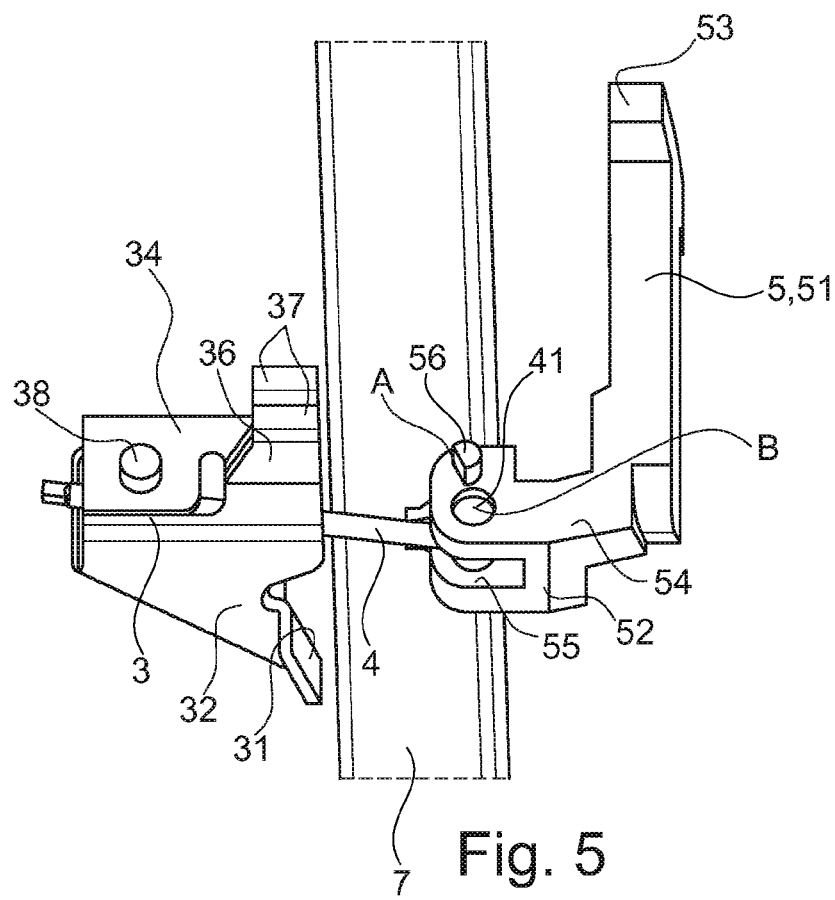
FIG. 5 is a perspective view with the lever and clamp in an open position according to the invention.

When attaching the load bar 1 to the rails 7 the load bar 1 is arranged in a way that the clamp 3 is positioned on the inner side of the rail 7 and the outer fixed clamping part 6 is positioned on the outer side of the rail 7. FIG. 5 shows a perspective view, when the attachment lever 5 is in an open position with the movable clamping part 3 and the fixed clamping part 6 on either side of the rail 7. In the open position the attachment lever 5 extends in the same direction as the rail 7 (in the figure, the main part 21 is not shown to better show how the locking operation is performed. This applies to FIGS. 3,4,5 and 6.)

Figure 6:
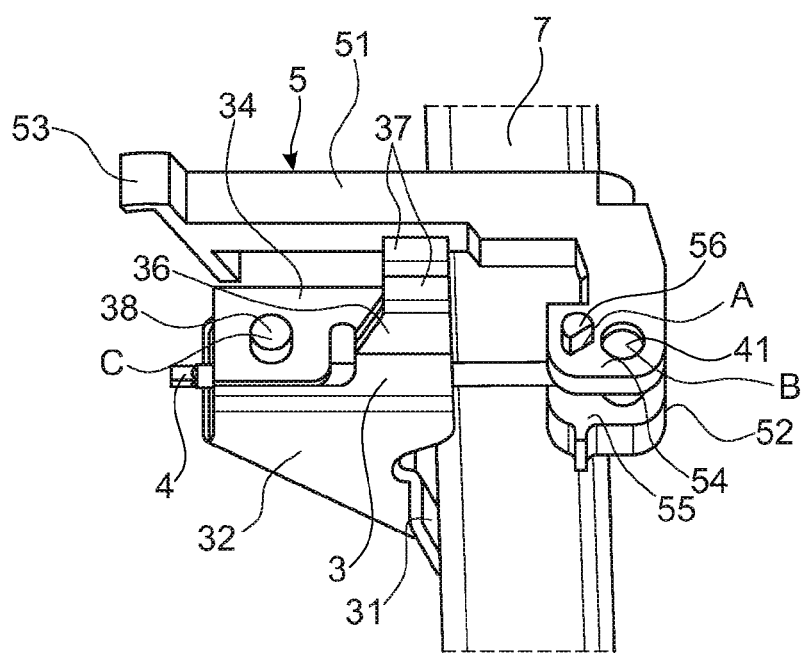
FIG. 6 is a perspective view with the lever and clamp in a closed position according to the invention.

To lock the load bar 1 to the rail 7 the attachment lever 5 is rotated, by movement in the horizontal plane, until it is positioned perpendicular to the rail 7 and is stored within the cutout 200 extending along the side of the main part 21 giving the support foot 2 a smooth and even outer which can be seen in FIG. 1. FIG. 6 is a perspective view with the attachment lever 5 in a closed position.

When it becomes necessary to release the load bar 1 the attachment lever 5 is moved from its stored position by grasping the grip 53 and rotate the attachment lever 5 clockwise in the horizontal plane to the open position.

In the closed position which is shown in FIG. 4 and FIG. 6 a line between the third pivot point C and the second pivot point B will be positioned slightly off centred (to the right) in relation to the fixed pivot point A since there is tension in the pull rod 4, this will create a momentum of the lever 5 in the locking direction, i.e. as soon as the line (between B-C) is off centred it will affect the lever 5 with a momentum, (locking on the right side and unlocking on the left side). When rotating the attachment lever 5 from the closed to the open position the lever 5 rotates in a clockwise direction about 90 degrees around the fixed pivot point A in the horizontal plane. When rotating the attachment lever 5, the coupling part 40 rotates in a clockwise direction a quarter turn around the fixed pivot point A so that the fixed pivot point A now is positioned on the right side of the pull rod 4. The movement around the fixed pivot point A moves the pull rod 4 and thereby also the clamp 3 away from the rail 7 and releases the clamping force between the clamp 3 and the outer part 6 on the rail 7. At a locking operation the above described operation will be performed the opposite way. The attachment lever 5 in the open position, see FIGS. 3 and 5, is rotated in a counter clockwise direction until it reaches the closed position. When rotating the attachment lever 5 in said counter clockwise direction around the fixed pivot point A, the coupling part 40 rotates about a quarter turn around the fixed pivot point A until the lever 5 is in a closed position. The terms clockwise and counter clockwise used above merely mean relative directions and the present invention is not limited to the disclosed directions. The angle between the open and the closed position of the lever 5 is preferably at least 90 degrees and may be up to 180 degrees.

As will be understood by those skilled in the present field of art, numerous changes and modifications may be made to the above described and other embodiments of the present invention, without departing from its scope as defined in the appending claims. For example the different parts as the clamp, the lever, the support foot and the load bar may be manufactured in the same or different materials such as plastic or metal. The skilled person also understands that all parts described above are not necessary to achieve the inventive functionality for example, it is not necessary that the support foot is arranged with an outer cover. It should also be understood that the attachment lever may be in positions between the closed and open positions and that the above described open and closed positions are when the attachment lever is in its outermost positions. The lever may also be positioned on any of the sides of the support foot, e.g. on the short side of the support foot but it is often an advantage to have it on the long side as described above, since the lever may then more easily be made longer and it may also be better from an aesthetic and ergonomic point of view. Indeed the lever 5 may also be prolonged to stretch over more than one side. Furthermore it is evident that it may be inverted, in relation to what is shown above, i.e. having the closing movement in the opposite direction, i.e. closing by pulling the lever 5 outwards. The pull rod may be a wire or similar. The load bar may also be arranged, instead of in a groove as described above, overlying the support foot giving the advantage that the load bar may move slightly relative to the support foot and not being locked at any longitudinally angle of the rail. In the description above is described an inner movable clamp and a fixed outer clamping part, the skilled person realizes that it may also be possible with an inverted solution that still achieve the same functionality. In that case the outer clamping part would be movable and the inner clamp would be fixed, the lever then locks when pulled outwards instead of inwards as described above. Still another possibility is that both the to inner clamp and the outer clamping part are movable.

The invention claimed is:

1. A support foot for a luggage carrier, for a vehicle, said support foot comprising:
   a main part;
   a first clamping part;
   a second clamping part wherein at least one of the clamping parts is movable in a first direction; and
   a clamping mechanism, said clamping mechanism including an attachment lever, arranged to secure the first clamping part and the second clamping part to clamping surfaces of a mounting rail, the mounting rail extending in a second direction, the first direction and second direction being perpendicular, wherein said attachment lever is arranged at one side of said main part and is arranged to be rotatable about a fixed pivot point in a first plane between a closed and an open position, and thereby also moving said at least one movable clamping part in a second plane parallel to the first plane and toward the other clamping part, the first plane and second plane extending in the first and second directions,
   wherein said attachment lever having a fixed pivot point (A) within said support foot about which the attachment lever is rotatable and also a movable second pivot point (B) attached to a coupling part connected to said clamping mechanism,
   wherein said clamping mechanism comprises a pull rod which is pivotably connected to said coupling part and said movable clamping part,
   wherein said pull rod in the opposite end to said coupling part is pivotably fixed at a third pivot point (C) within said movable clamping part.

2. The support foot according to claim 1, wherein said first clamping part is fixed to said main part.

3. The support foot according to claim 1, wherein the main part is arranged with a recess arranged to at least partly contain said lever in a closed position.

4. The support foot according to claim 3 wherein the attachment lever in a closed position is flush with a surface of said main part.

5. The support foot according to claim 1, wherein said pull rod is rotatably fixed to the lever at said second pivot point (B) at a position to urge the attachment lever in a closing direction when in its locked position.

6. The support foot according to claim 1, wherein at least one of said clamping parts is arranged with a sliding clamping surface arranged to move a gripping portion to secure a load bar.

7. The support foot according to claim 1, wherein said attachment lever comprises an outer gripping portion that is wider than an intermediate portion thereof.

8. The support foot according to claim 7, wherein the intermediate portion is thinner than 10 mm.

9. The support foot according to claim 1, wherein an angle ($\alpha$) between the open and the closed position of the attachment lever is at least 90°.

10. The support foot according to claim 1, wherein the third pivot point (C) is arranged at an end of the pull rod that is distal to the movable clamping part with respect to the clamping surfaces of the mounting rail.

11. A method for attaching a support foot for a luggage carrier to a rail of a vehicle, comprising:
   providing a support foot including a main part, a first clamping part and a second clamping part wherein at least one of the clamping parts is movable in a first direction and a clamping mechanism,
   providing said clamping mechanism with an attachment lever, arranged to secure the first clamping part and the second clamping part to clamping surfaces of a mounting rail, the mounting rail extending in a second direction, the first and second direction being perpendicular, by arranging said attachment lever at one side of said main part and operating said attachment lever being arranged to be rotatable about a fixed pivot point in a first plane between a closed and an open position, and thereby also moving said at least one movable clamping part in a second plane parallel to the first plane and toward the other clamping part, the first plane and second plane extending in the first and second directions,
   wherein said attachment lever having a fixed pivot point (A) within said support foot about which the attachment lever is rotatable and also a movable second pivot point (B) attached to a coupling part connected to said clamping mechanism,
   wherein said clamping mechanism comprises a pull rod which is pivotably connected to said coupling part and said movable clamping part,
   wherein said pull rod in the opposite end to said coupling part is pivotably fixed at a third pivot point (C) within said movable clamping part.

12. The method according to claim 11, wherein providing at least one of said clamps with a sliding clamping surface arranged to move a gripping portion to secure a load bar.

13. The method according to claim 11, wherein operating said attachment lever an angle ($\alpha$) between the open and the closed position that is at least 90°.

14. The method according to claim 11, wherein the third pivot point (C) is arranged at an end of the pull rod that is distal to the movable clamping part with respect to the clamping surfaces of the mounting rail.

* * * * *